(12) United States Patent
Kim et al.

(10) Patent No.: US 7,443,653 B2
(45) Date of Patent: Oct. 28, 2008

(54) CHIP TYPE SOLID ELECTROLYTIC CAPACITOR

(75) Inventors: Jae Kwang Kim, Gyunggi-do (KR); Gyu Hwang Lee, Gyunggi-do (KR); Kwan Hyeong Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 11/826,247

(22) Filed: Jul. 13, 2007

(65) Prior Publication Data

US 2008/0019081 A1    Jan. 24, 2008

(30) Foreign Application Priority Data

Jul. 18, 2006    (KR) .................. 10-2006-0067070

(51) Int. Cl.
*H01G 9/00* (2006.01)

(52) U.S. Cl. .................. 361/523; 361/525; 361/528; 361/529; 361/534; 361/516; 29/25.01; 29/25.03

(58) Field of Classification Search ................ 361/523, 361/525, 516–519, 528, 529, 534, 538, 540, 361/508–512; 29/25.01, 25.03, 25.41, 25.42
See application file for complete search history.

(56) References Cited

U.S. PATENT DOCUMENTS 5,483,415 A * 1/1996 Nakamura et al. .......... 361/529
6,229,688 B1 * 5/2001 Kobayashi et al. .......... 361/523
6,236,561 B1 * 5/2001 Ogino et al. ................ 361/523
6,238,444 B1 * 5/2001 Cadwallader .............. 29/25.03
6,262,878 B1 * 7/2001 Shirashige et al. .......... 361/508
6,970,345 B2 * 11/2005 Oh et al. ..................... 361/540

FOREIGN PATENT DOCUMENTS

JP    2001-267181    9/2001
JP    2002-13436    1/2002
JP    2004-104048    4/2004

\* cited by examiner

*Primary Examiner*—Nguyen T Ha
(74) *Attorney, Agent, or Firm*—McDermott Will & Emery LLP

(57) ABSTRACT

A chip type solid electrolytic capacitor, in which a PCB includes anode and cathode connection lands formed on upper parts of an insulation board, and anode and cathode terminals formed on lower parts of the insulation board. The anode and cathode terminals are electrically connected to the anode and cathode connection lands, respectively, through vias. An anode connection member is formed on the anode connection land. A capacitor device having an anode lead and a cathode layer is mounted on the PCB with the anode lead weld-connected to the anode connection member and the cathode layer electrically connected to the cathode connection land via a conductive adhesive. An outer resin covers side and upper parts of the PCB including the capacitor device. The anode terminal and the cathode terminal have stepped-down surfaces which are formed along at least parts of peripheral portions thereof, respectively, and covered by the outer resin.

7 Claims, 4 Drawing Sheets

CHIP TYPE SOLID ELECTROLYTIC CAPACITOR

CLAIM OF PRIORITY

This application claims the benefit of Korean Patent Application No. 2006-0067070 filed on Jul. 18, 2006, in the Korean Intellectual Property Office, the disclosure of which is incorporated herein by reference.

BACKGROUND OF THE INVENTION

1. Field of the Invention

The present invention relates to a chip type solid electrolytic capacitor and, more particularly, to a chip type solid electrolytic capacitor, which has a stepped-down surface formed at a lower terminal thereof in order to increase the adhesive strength of the lower terminal after a molding process.

2. Description of the Related Art

There have been continued developments in a chip type solid electrolytic capacitor, which has a capacitor element disposed on a Printed Circuit Board (PCB), so as to achieve miniaturization and high capacity with improved volume efficiency from a tantalum capacitor.

An example of such a chip type solid electrolytic capacitor disclosed in Japanese Laid-Open Publication Application 2002-134362. FIG. 1 is a schematic perspective view illustrating a part of the chip type solid electrolytic capacitor suggested in the publication application.

As shown in FIG. 1, the conventional chip type electrolytic capacitor includes an anode connection land 13 and a cathode connection land 15 formed on upper surfaces of an insulation board 11; a PCB 10 with an anode terminal 17 and a cathode terminal 19 formed corresponding to the positions of the anode connection land 13 and the cathode connection land 15, the anode and cathode terminals 17 and 19 electrically connected to the anode and cathode connection lands 13 and 15 through vias; a conductor 30 formed on the anode connection land 13; a capacitor element having an anode lead 50 and a cathode layer formed thereon and mounted on the PCB with the anode lead 50 welded to the conductor 30 and the cathode layer electrically connected to the cathode connection land 15 through a conductive adhesive 70; and an outer sheath resin 90 formed on the PCB including the capacitor element.

However, when the chip type solid electrolytic capacitor having the connection lands on the PCB with the above configuration is made into a product, the anode terminal and the cathode terminal may be detached from the PCB by external impacts, for example, during transportation, causing malfunction of the product.

Therefore, there arises a need for a chip type solid electrolytic capacitor which can remedy such problems.

SUMMARY OF THE INVENTION

The present invention has been made to solve the foregoing problems of the prior art and therefore an aspect of the present invention is to provide a chip type solid electrolytic capacitor, in which a lower terminal has a stepped shape and a resin covers the stepped portions of the lower terminal, thereby improving adhesion strength of the lower terminal even after a molding process of the resin.

According to an aspect of the invention, the invention provides a chip type solid electrolytic capacitor, which includes a printed circuit board including an anode connection land and a cathode connection land formed on upper parts of an insulation board, and an anode terminal and a cathode terminal formed on lower parts of the insulation board corresponding to the positions of the anode and cathode connection lands, respectively, the anode and cathode terminals electrically connected to the anode and cathode connection lands, respectively, through vias; an anode connection member formed on the anode connection land; a capacitor device having an anode lead and a cathode layer formed thereon, the capacitor device mounted on the printed circuit board with the anode lead weld-connected to the anode connection member, and the cathode layer electrically connected to the cathode connection land via a conductive adhesive; and an outer resin covering side and upper parts of the printed circuit board including the capacitor device; wherein the anode terminal and the cathode terminal have stepped-down surfaces formed along at least parts of peripheral portions thereof, respectively, and the stepped-down surfaces are also covered by the outer resin.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
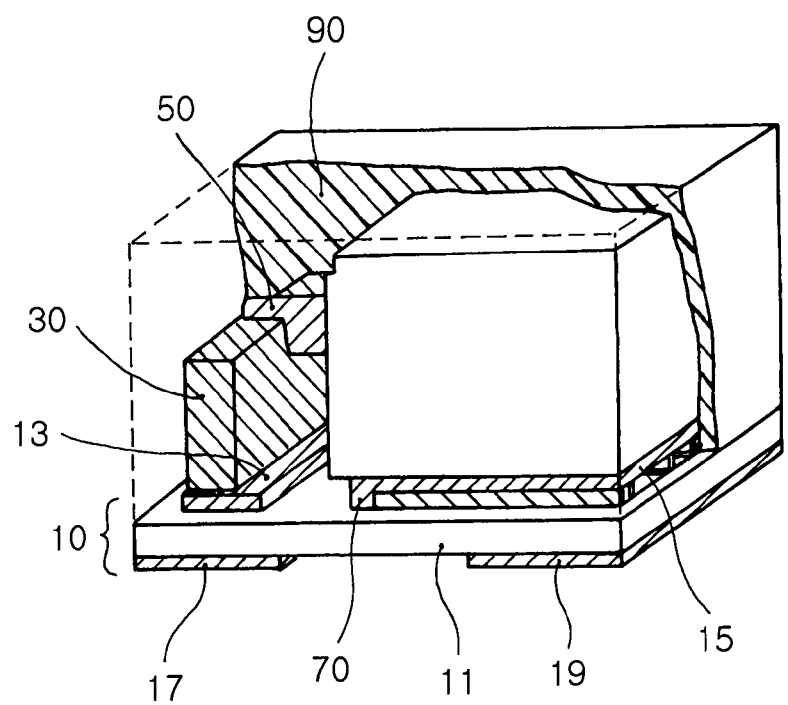
FIG. 1 is a schematic perspective view illustrating a conventional chip type solid electrolytic capacitor.
Figure 2:
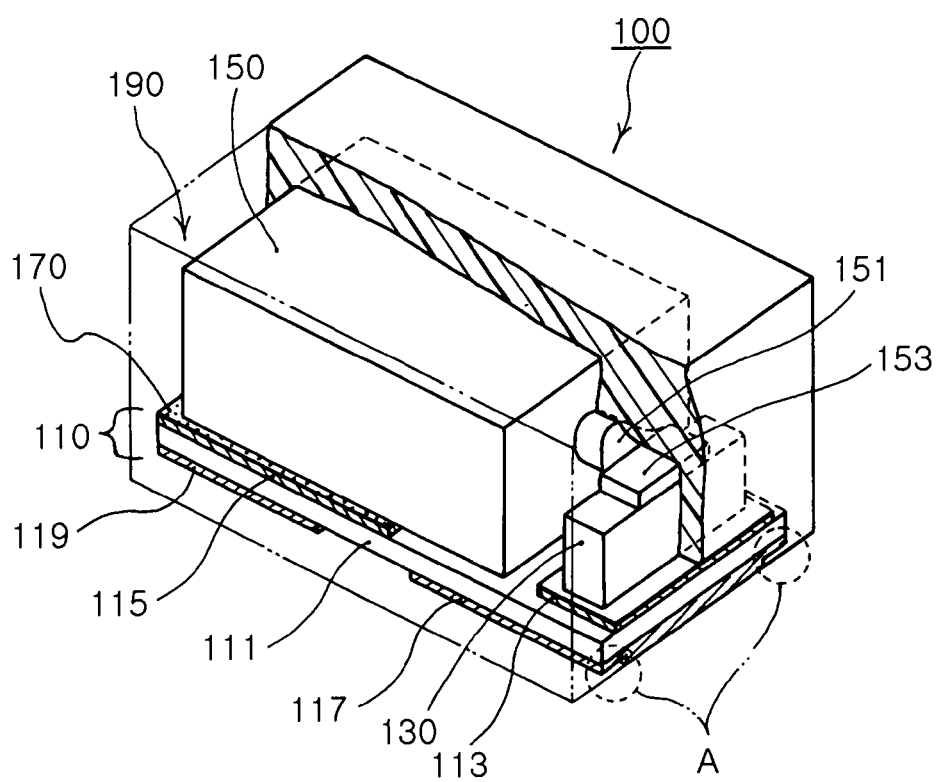
FIG. 2 is a schematic perspective view illustrating a chip type electrolytic capacitor according to an embodiment of the present invention.

FIG. 2 is a schematic perspective view illustrating a chip type solid electrolytic capacitor according to an embodiment of the present invention.

As shown in FIG. 2, the chip type solid electrolytic capacitor 100 according to an embodiment of the present invention includes a Printed Circuit Board (PCB) 110. The PCB 110 includes an anode connection land 113 and a cathode connection land 115 formed on upper parts of an insulation board 111, and an anode connection land 113 and a cathode connection land 115 formed on lower parts of the insulation board 110 corresponding to the positions of the anode connection land 113 and the cathode connection land 115. The anode and cathode terminals 117 and 119 are electrically connected to the connection lands 113 and 115 through vias (not shown), respectively.

In the present invention, the insulation board 111 can be made of an epoxy resin, a polyimide resin, etc. In addition, each of the connection lands 113 and 115 and the anode and cathode terminals 117 and 119 can be composed of a conductive layer of copper clad or copper plating, and the vias are copper-plated by a generally known method. In addition, Ni or Au can be plated on the conductive layer. The PCB 110 of the above described configuration can be easily made by a generally known method.

Figure 3A:
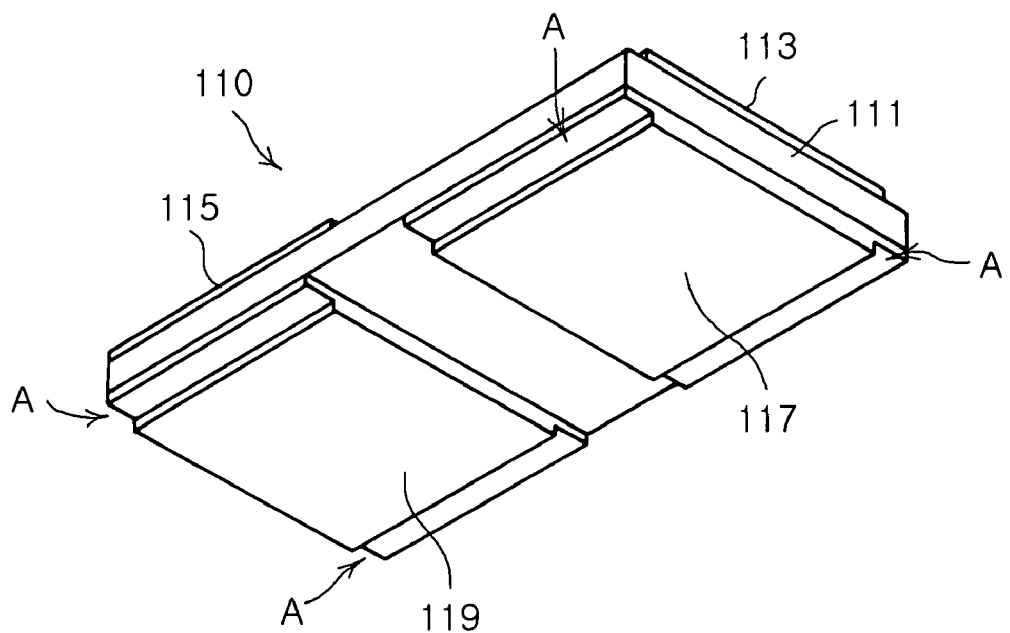
FIGS. 3a to 3f are schematic views showing examples of the stepped-down surfaces formed along the periphery of the lower terminal in the chip type solid electrolytic capacitor according to the present invention.
Figure 3B:
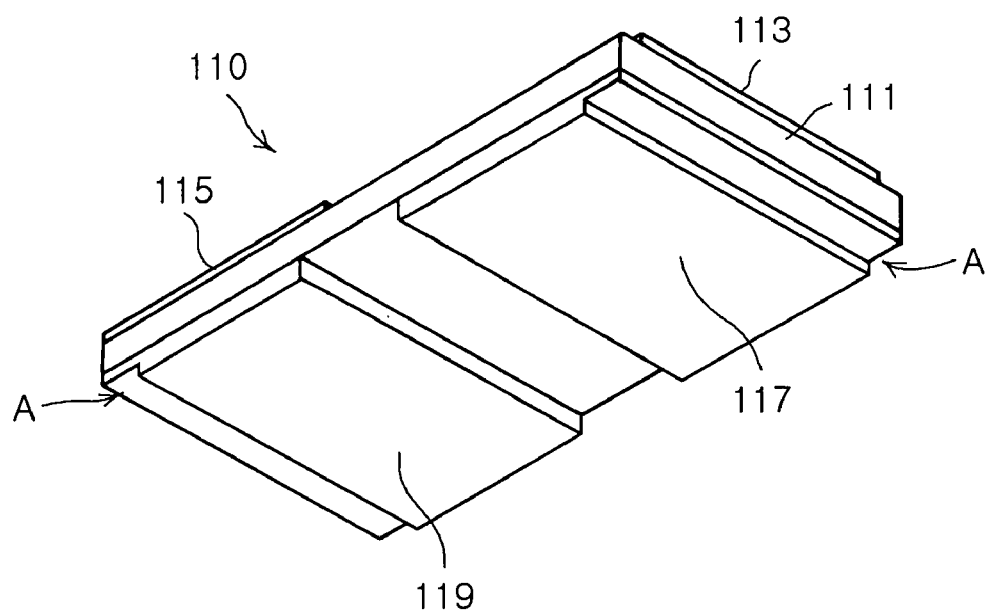
Figure 3C:
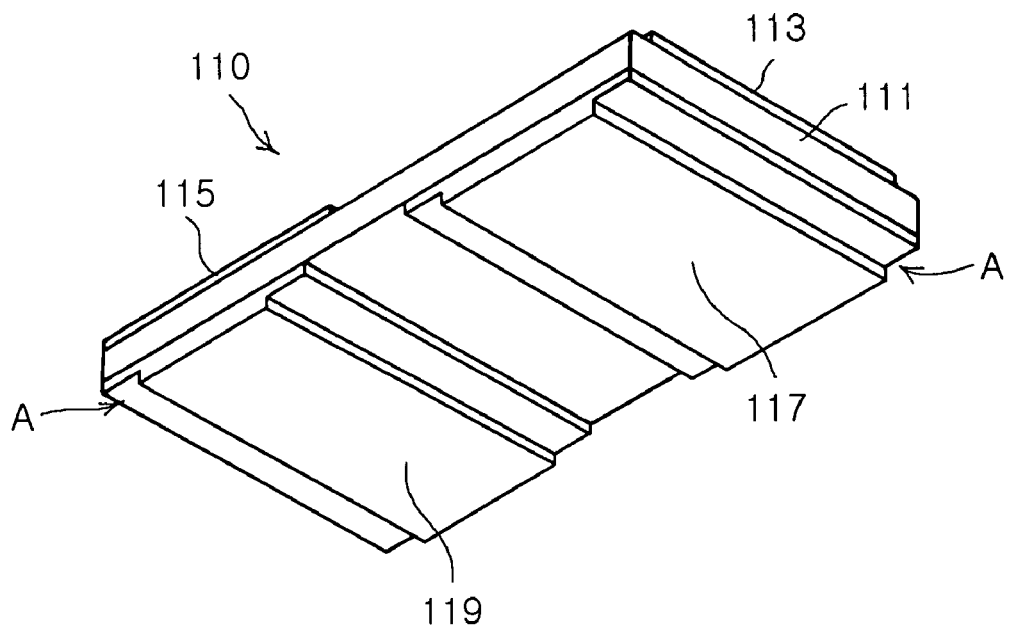
Figure 3D:
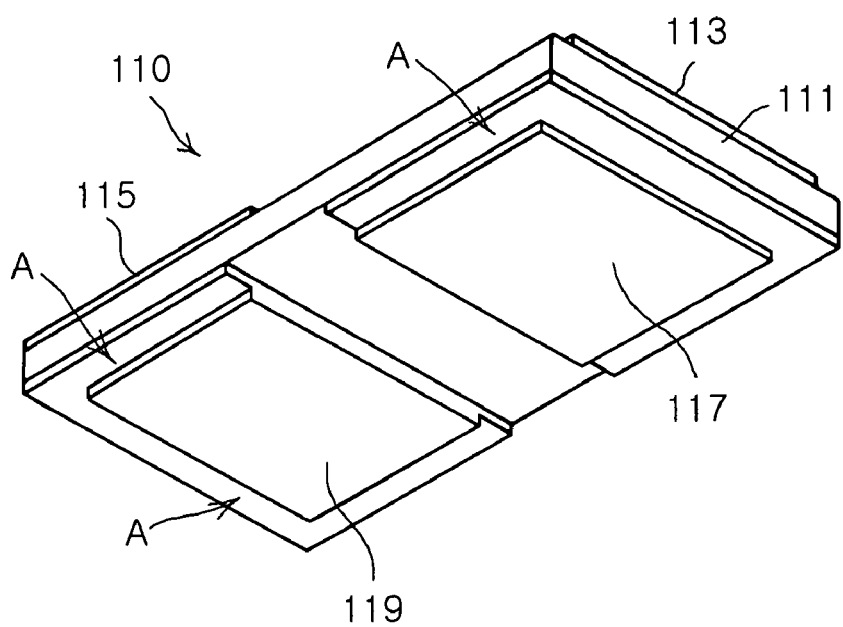
Figure 3E:
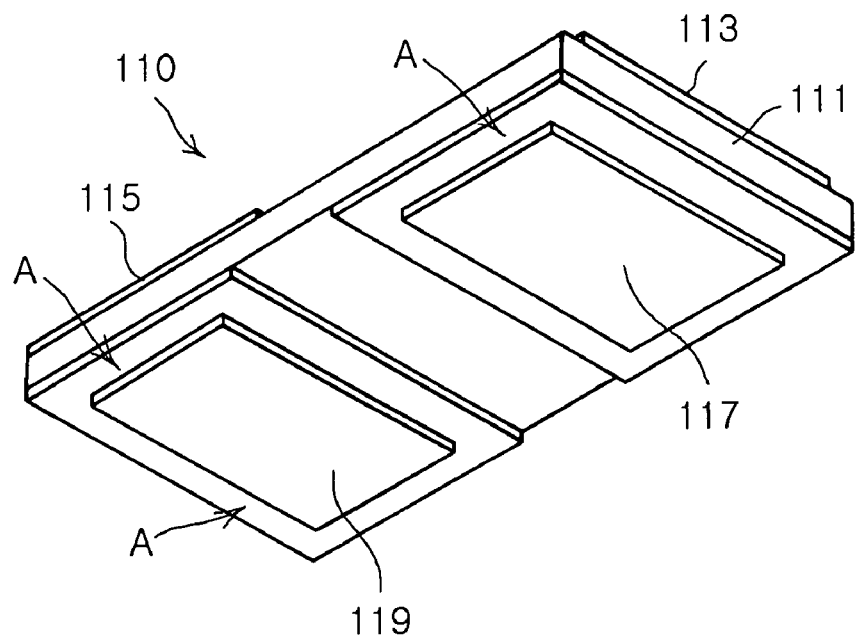
Figure 3F:
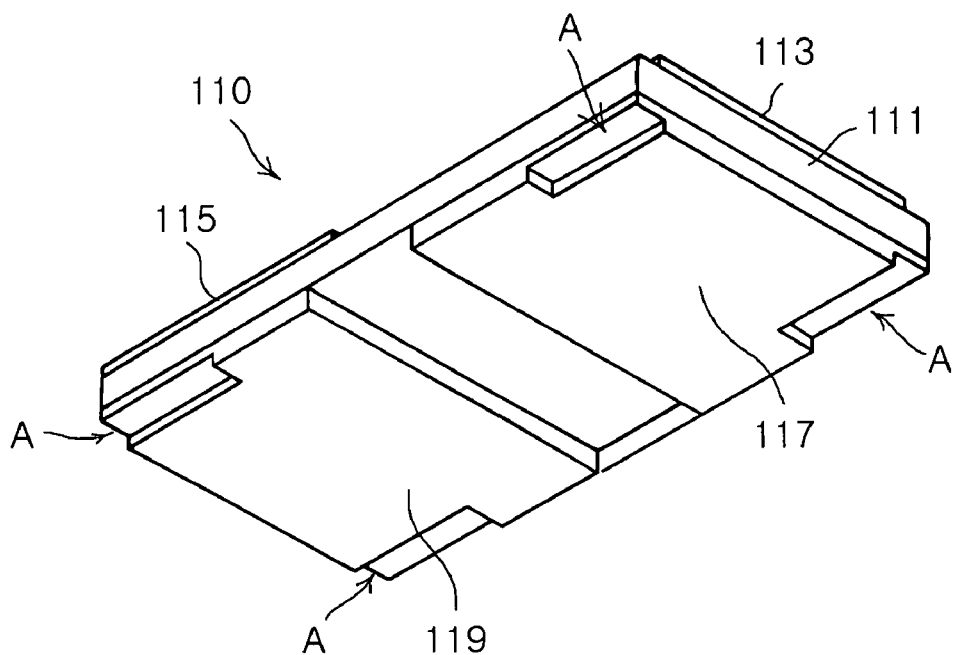

In the meantime, in the present invention, the anode terminal 117 and the cathode terminal 119 formed on lower parts of the insulation board 111 have stepped-down surfaces A formed along at least parts of peripheral portions thereof. Such stepped-down surfaces A, as shown in FIG. 3(a), can be formed along peripheral portions of the terminals, in a length direction of the insulation board 111, or as shown in FIG. 3b to 3c, can be formed in a width direction of the insulation board 111. Also, as shown in FIG. 3d, they can be formed along peripheral portions of three edges of the terminals, or as shown in FIG. 3e, can be formed along peripheral portions of all edges of the terminals. In addition, as shown in FIG. 3f, they can be formed along particular parts of the peripheral portions of the terminals, respectively.

As described above, by forming the stepped-down surfaces A along at least parts of the peripheral portions of the terminals 117 and 119, the outer resin can be molded over the stepped down surfaces A in a subsequent molding process, thereby further improving the adhesion strength of the terminals 117 and 119.

In addition, in an embodiment of the present invention, the stepped-down surfaces A are formed in a stepwise shape, but the present invention is not limited to such. For example, the present invention also includes forming the stepped-down surfaces in any desired shapes along at least parts of peripheral portions of the terminals so long as the resin can fix the terminals 117 and 119 in the subsequent molding process of the outer resin.

In addition, the chip type solid capacitor according to the present invention includes a beam-shaped anode connection member 130 formed on the anode connection land 113 of the PCB 110. The beam-shaped anode connection member 130 can be a conductive material, and preferably, is made of copper, copper alloys or Fe—Ni alloys. In addition, it is preferable that the beam-shaped anode connection member 130 is connected to the anode connection land 113 by laser welding.

Further, the chip type electrolytic capacitor according to the present invention includes a capacitor device 150 mounted on the printed circuit board 10. The capacitor device has an anode lead 151 and a cathode layer formed thereon, and the anode lead 151 can be weld-connected to the beam-shaped anode connection member 130 via an anode welding member 153 by laser welding or spot welding. In addition, the cathode layer is electrically connected to the cathode connection land 115 via a conductive adhesive 170.

In the present invention, it is preferable that the conductive adhesive 170 is made of a metal paste made of one selected from the group consisting of Au, Ag, Cu and Ni.

In addition, the chip type electrolytic capacitor according to the present invention includes an outer resin 190 molded over the side/upper parts of the PCB 10 with the capacitor device 170 mounted thereon. The outer resin can include, for example, an epoxy resin.

At this time, the outer resin 190 is molded not only over the side and upper parts of the chip type solid electrolytic capacitor but also over the stepped-down surfaces A formed along peripheral portions of the anode terminal 117 and the cathode terminal 119 formed on lower parts of the insulation board 111. The outer resin molded over the stepped-down surfaces A further increases the adhesive strength of the anode terminal 117 and the cathode terminal 119 formed on lower parts of the insulation board 111. This allows effective protection of the capacitor device from external impacts, etc. when the chip type solid electrolytic capacitor fabricated as described above is mounted on a board and made into a product, thereby ensuring the reliability of the product.

In addition, the chip type solid electrolytic capacitor according to the present invention can also include two or more capacitor devices mounted on the board 10. The two or more tantalum capacitor devices can be mounted in a parallel arrangement on the board 10 to expand the surface area of the devices, thereby promoting capacity expansion and improving Effective Series Resistance (ESR) characteristics.

Now, a fabrication process of the chip type solid electrolytic capacitor according to an embodiment of the present invention will now be explained with reference to FIGS. 2 and 3.

According to the present invention, first, a PCB 110 including an insulation board 111 with copper clad or conductive metal layers formed on opposed surfaces thereof in different thicknesses is prepared. That is, the copper clad or the conductive metal layer is formed in a larger thickness on the lower part than on the upper part of the insulation board 111. At this time, it is preferable that the copper clad or conductive metal layer on the upper part has a thickness of up to about 0.05 mm, and the copper clad or the conductive metal layer on the lower part has a thickness ranging from 0.05 to 0.2 mm.

In addition, according to the present invention, vias are formed through predetermined positions of the board with the above copper clad or the conductive metal layer, and the vias are plated with copper or other material in order to prepare for mounting on the PCB by a generally known method. The vias can be formed by a generally known mechanical method, and formed in a diameter of about 0.02 to 0.2 mm.

The fabrication method of the PCB adopted in the present invention is identical with the generally known fabrication method of a PCB, except that during the process of forming the copper clad or the conductive metal layer, stepped-down surfaces in a stepwise shape are formed by half etching as described later. The insulation board can be made of any material making up the PCB, preferably a polyimide film, and has a thickness of about 0.02 to 0.1 mm.

Then, photoresist films are attached on opposed surfaces of the board 110, and the copper clad is etched by a typical exposure or development process, thereby forming the patterns of the anode connection land 113, the cathode connection land 115, the anode terminal 117 and the cathode terminal 119. At this time, it is preferable that the cathode connection land 115 on which the tantalum device is mounted is formed larger, which is to enhance the stability of the tantalum device and the ESR characteristics of a product.

Subsequently, according to the present invention, as shown in FIG. 3, the stepped-down surfaces A are formed along at least parts of peripheral portions of the anode terminal 117 and the cathode terminal 119. The stepped-down surfaces can easily be formed by applying the generally known half etching technique.

In addition, a beam-shaped anode connection member 130, which is a conductive material made of Cu, Cu alloys or Fe—Ni alloys, is connected onto the anode connection land 113 of the above prepared board 110 by laser welding.

Then, a capacitor device 150, which has an anode lead 151 formed on an anode material made of a tantalum metal, and has a dielectric layer, a solid electrolytic layer and a cathode layer sequentially formed on the anode material through a generally known process, is prepared.

Then, the capacitor device 150 fabricated as above is mounted on the board 110 and adjusted in its position so that the cathode layer 153 is placed on the cathode connection land 115 and the anode lead 151 is placed on the beam-shaped anode connection member 130. Also, the cathode layer 153 of the capacitor device 150 is connected to the cathode connection land 113 of the board 110 via a conductive adhesive such as an Ag paste 170, and the anode lead 151 is weld-connected to the anode connection member 130 via the anode welding member 153.

Then, an outer resin 190 such as an epoxy resin is molded over side and upper parts of the capacitor device 150 mounted on the board 110 as described above. At this time, the outer resin 190 is molded over the stepped-down surfaces A formed along peripheral portions of the anode terminal 117 and the cathode terminal 119.

In the meantime, according to the present invention, two or more capacitor devices 150 can be mounted on a larger board 110, and the outer resin 190 can be molded over the exterior, in which case, the resultant structure can be cut into individual chip type solid electrolytic capacitors after the molding process of the resin.

Now, the present invention will be explained in greater detail through examples.

EXAMPLE

A board including a polyimide film, which is an insulation board, with copper clad on upper and lower parts thereof was prepared. Then, an anode connection land and a cathode connection land were formed on upper parts of the insulation board, and an anode terminal and a cathode terminal were formed on lower parts of the insulation board, corresponding to the respective lands. At this time, as shown in FIG. 3d, the anode terminal and the cathode terminal were formed to have stepped down surfaces along peripheral portions thereof by a generally known half etching process in order to enhance the adhesion strength of the terminals through the subsequent molding of a resin. For comparison, the stepped-down surfaces were not formed in some of the boards. Then, each of beam-shaped anode connection members was connected onto each of the anode connection lands of the boards by laser welding.

Then, each of capacitor devices fabricated by the known method was mounted on the board, and an epoxy resin was molded over side and upper parts of each of the boards, thereby fabricate a plurality of chip type solid electrolytic capacitors. In the meantime, each of the cathode layers was connected to each of the cathode connection lands of the board by a conductive adhesive such as Ag paste, and each of the anode leads of the capacitor devices was weld-connected to each of the anode connection members.

Each of the chip type solid electrolytic capacitors fabricated as above was mounted on a PCB, and force was applied to each of the capacitors in a horizontal or lateral direction for a predetermined velocity (2.5 mm/s) for 10 seconds [19.8N(2 kgf)] to measure the adhesion strength of the terminals. The results are shown in Tables 1 and 2 below. Table 1 shows measurement values of the chip type solid electrolytic capacitors without the stepped-down surfaces formed in the terminals, and Table 2 shows measurement values of the chip type solid electrolytic capacitors with the stepped-down surfaces formed in the terminals.

TABLE 1

| No. | Force necessary for detachment (kgf) |
| --- | --- |
| 1 | 0.648 |
| 2 | 0.466 |
| 3 | 0.586 |
| 4 | 0.820 |
| 5 | 0.446 |
| 6 | 0.522 |

TABLE 1-continued

| No. | Force necessary for detachment (kgf) |
| --- | --- |
| 7 | 0.628 |
| Mean | 0.588 |

TABLE 2

| No. | Force necessary for detachment (kgf) |
| --- | --- |
| 1 | 1.474 |
| 2 | 1.588 |
| 3 | 1.765 |
| 4 | 1.148 |
| 5 | 1.618 |
| 6 | 1.274 |
| Mean | 1.474 |

As seen from the above Tables 1 and 2, the chip type solid electrolytic capacitors with the stepped-down surfaces formed along the peripheral portions of the anode terminal and the cathode terminal in Table 2 show higher adhesion strength of the terminals than those without the stepped-down surfaces in Table 1. This is resultant from the outer resin molded over the stepped-down surfaces to fix the terminals, indicating that the capacitors with stepped-down surfaces possess superior adhesion strength of the terminals than those without the stepped-down surfaces.

According to the present invention set forth above, a chip type solid capacitor has stepped-down surfaces along at least parts of peripheral portions of lower terminals of a board, and an outer resin is molded over the stepped-down surfaces in a molding process, thereby improving the adhesion strength between the lower terminals and the board. As a result, the chip type solid electrolytic capacitor according to the present invention can be applied to various products, ensuring superior reliability.

While the present invention has been shown and described in connection with the exemplary embodiments, it will be apparent to those skilled in the art that modifications and variations can be made without departing from the spirit and scope of the invention as defined by the appended claims.

What is claimed is:

1. A chip type solid electrolytic capacitor comprising:
a printed circuit board including an anode connection land and a cathode connection land formed on upper parts of an insulation board, and an anode terminal and a cathode terminal formed on lower parts of the insulation board corresponding to the positions of the anode and cathode connection lands, respectively, the anode and cathode terminals electrically connected to the anode and cathode connection lands, respectively, through vias;
an anode connection member formed on the anode connection land;
a capacitor device having an anode lead and a cathode layer formed thereon, the capacitor device mounted on the printed circuit board with the anode lead weld-connected to the anode connection member, and the cathode layer electrically connected to the cathode connection land via a conductive adhesive; and
an outer resin covering side and upper parts of the printed circuit board including the capacitor device;
wherein the anode terminal and the cathode terminal have stepped-down surfaces formed along at least parts of peripheral portions thereof, respectively, and the stepped-down surfaces are also covered by the outer resin.

2. The chip type solid electrolytic capacitor according to claim 1, wherein the conductive adhesive comprises a metal paste made of one selected from the group consisting of Au, Ag, Cu and Ni.

3. The chip type solid electrolytic capacitor according to claim 1, wherein the capacitor device comprises at least two capacitor devices mounted on the board.

4. The chip type solid electrolytic capacitor according to claim 1, wherein the stepped-down surfaces are formed along entire peripheral portions of the anode and cathode terminals, respectively, in a longitudinal direction of the insulation board.

5. The chip type solid electrolytic capacitor according to claim 1, wherein the stepped-down surfaces are formed along entire peripheral portions of the anode and cathode terminals, respectively, along a width direction of the insulation board.

6. The chip type solid electrolytic capacitor according to claim 1, wherein the stepped-down surfaces are formed along entire peripheral portions of the anode and cathode terminals along longitudinal and with directions of the insulation board.

7. The chip type solid electrolytic capacitor according to claim 1, wherein the stepped-down surfaces are formed along parts of peripheral portions of the anode and cathode terminals, respectively, along a longitudinal direction of the insulation board.

* * * * *